United States Patent [19]

Gautier et al.

[11] Patent Number: 5,233,907
[45] Date of Patent: Aug. 10, 1993

[54] PNEUMATIC BOOSTER WITH DOUBLE-PURPOSE SHUTTER

[75] Inventors: Jean-Pierre Gautier; Ulysse Verbo, both of Aulnay-Sous-Bois, France

[73] Assignee: Bendix Europe Services Techniques, Drancy, France

[21] Appl. No.: 859,752

[22] Filed: Mar. 30, 1992

[30] Foreign Application Priority Data

Apr. 17, 1991 [FR] France ................. 9104702

[51] Int. Cl.⁵ .............................................. F15B 9/10
[52] U.S. Cl. .................................................. 91/376 R
[58] Field of Search ................... 91/369.1, 369.2, 369.3, 91/369.4, 376 R

[56] References Cited

U.S. PATENT DOCUMENTS 3,149,539 9/1964 Prather .
4,598,548 7/1986 Wagner ............................. 91/369.2

FOREIGN PATENT DOCUMENTS 1279454 11/1961 France .
2537524 6/1984 France .
2116270 9/1983 United Kingdom ............... 91/369.2

Primary Examiner—Edward K. Look
Assistant Examiner—F. Daniel Lopez
Attorney, Agent, or Firm—Larry J. Palguta; Ken C. Decker

[57] ABSTRACT

The invention relates to a pneumatic brakebooster possessing a casing (10), within which is located a piston (22, 14, 102) formed from a rear tubular part (22) supporting a skirt (14) and, with the aid of an unrolling diaphragm (12), defining a front chamber (16) connected permanently to a vacuum source and a rear chamber (18) connected selectively to the front chamber (16) or to the atmosphere by a valve mechanism (136, 138, 140) actuated by a control rod (34) capable of bearing by way of a plunger (32) on one of the faces of a reaction disk (58) fixed to a push rod (56), a return spring (150) for the control rod (34) being arranged between the skirt (14) of the piston and the plunger (32), the valve mechanism (136, 138, 140) possessing a shutter (138) interacting by an active part made rigid by an insert (118) with a first valve seat (136) formed on the plunger (32) and with a second valve seat (140) formed on the piston (14), the shutter (138) being formed by a flexible tubular diaphragm (114), the active part of the shutter (138) being located between the two ends (112, 116) of the flexible tubular diaphragm (114). According to the invention, the shutter (138) possesses orifices (120) allowing communication between the front chamber (16) and the rear chamber (18).

7 Claims, 2 Drawing Sheets

PNEUMATIC BOOSTER WITH DOUBLE-PURPOSE SHUTTER

The present invention relates to pneumatic boosters and more particularly those of the type which are used to boost the braking of motor vehicles.

Boosters of this type conventionally comprise a piston having a rear tubular part and a skirt and, with the aid of an unrolling diaphragm, defining a front chamber connected permanently to a vacuum source and a rear chamber connected selectively to the front chamber or to the atmosphere by a valve means actuated by a control rod capable of bearing by means of a plunger on one of the faces of a reaction disk fixed to a push rod, a return spring for the control rod being arranged between the skirt of the piston and the plunger, the valve means possessing a shutter interacting by an active part made rigid by an insert with a first valve seat formed on the plunger and with a second valve seat formed on the piston, the shutter being formed by a flexible tubular diaphragm, the active part of the shutter being located between the two ends of the flexible tubular diaphragm.

Such boosters, as illustrated, for example, by the document EP-A-0,004,477, have some disadvantages. Thus, to avoid the control rod having too long an idle travel, it is necessary to design the valve means in such a way that the "shutter lift" between the shutter and the second valve seat is as small as possible. On the other hand, during braking, the passage presented to the atmospheric air towards the rear chamber is reduced, as is the passage presented to the air from the rear chamber towards the front chamber during brake release. The functioning of these boosters is therefore accompanied by air-suction noises which can become troublesome, the more so because the structure of the piston hub, having a single radial passage towards the rear chamber and a single axial passage towards the front chamber, also induces pronounced turbulence in the moving air. Another disadvantage attributable to these reduced and turbulent air passages lies in the fact that the air is slowed down greatly in its various movements between the atmosphere, the rear chamber and the front chamber, and therefore that the boosters have high response times.

The document U.S. Pat. No. 4,598,548 makes solve these drawbacks, but still comprises a conventional valve means housed in the tubular central part formed at the rear part of the booster casing. This latter must then be of a special design. Moreover, according to this document, the structure of the piston hub has a single radial passage towards the rear chamber and a single axial passage towards the front chamber, also inducing pronounced turbulences in the moving air, detrimental for the response time of the servomotor, by the slowing of the air they impose, and generating noises when functioning.

An object of the present invention is, therefore, to provide a booster which functions silently and the response time of which is the lowest possible, this being achieved in a simple, reliable and economical way. For this purpose, the subject of the invention is a booster in which the air passages between the atmosphere and the rear chamber on the one hand, and the rear chamber and the front chamber on the other hand, have the largest possible cross-section, without presenting any obstacles which can generate turbulence.

According to the present invention, the shutter possesses orifices allowing communication between the front chamber and the rear chamber.

According to an advantageous feature of the invention, the orifices made in the shutter are located in its active part between the first valve seat and the second valve seat.

The invention will now be described by way of example with reference to the accompanying drawings in which:

FIG. 1 shows part of a brake-booster intended to be placed in the conventional way between the brake pedal of a vehicle and the master cylinder controlling the hydraulic brake circuit of this vehicle. By convention, the part of the booster facing the master cylinder is called the front of the booster and the part facing the brake pedal the rear of the booster.

Figure 1:
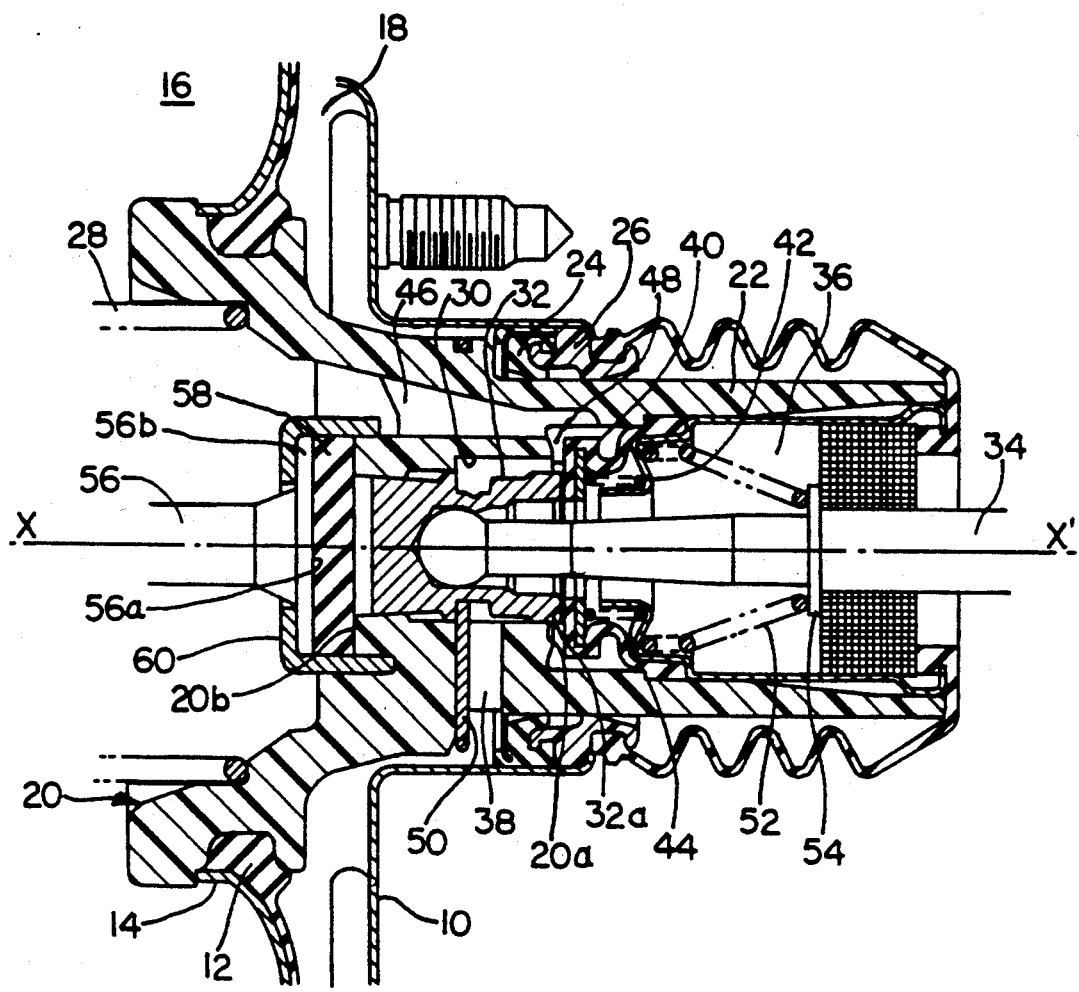
FIG. 1 is a side view in longitudinal section illustrating the central part of a pneumatic brake-booster of a known type, for example from the above-mentioned document EP-A-0 004 477.

The booster of FIG. 1 comprises a shell-shaped outer casing 10 having rotational symmetry about an axis X—X'. Only the rear central part of this casing 10 is shown in FIG. 1.

A flexible elastomeric unrolling diaphragm 12, reinforced in its central part by a metal supporting disk 14 also called a skirt, defines within the space delimited by the casing 10 a front chamber 16 and a rear chamber 18. The outer peripheral edge (not shown) of the diaphragm 12 is fastened sealingly to the outer casing 10. The inner peripheral edge of this same diaphragm terminates in a bead received sealingly in an annular groove formed on the outer peripheral surface of a hollow boost piston 20 arranged along the axis X—X' of the booster. This hollow piston 20 is extended rearwards in the form of a tubular part 22 which passes sealingly through the rear wall of the casing 10. The sealing of this passageway is ensured by a reinforced annular gasket 24 which is fastened by a ring 26 in a tubular central part extending the rear wall of the casing 10 rearwards.

A compression spring 28 interposed between the piston 20 and the front wall (not shown) of the outer casing 10 normally keeps the piston 20 and the skirt 14 in a rear rest position, illustrated in FIG. 1, in which the rear chamber 18 is at its minimum volume and the front chamber 16 at its maximum volume.

In its central part located between the tubular rear part 22 and the front part in which the diaphragm 12 and the skirt 14 are fastened, the piston 20 has a bore 30, in which is received slideably a plunger 32 likewise possessing rotational symmetry about the axis X—X'. The front end of a control rod 34 of the booster, likewise arranged along the axis X—X', is mounted in the plunger 32 in the manner of a ball joint. The rear end (not shown) of this rod 34, projecting outside the tubular part 22 of the piston 20, is controlled directly by the brake pedal (not shown) of the vehicle.

The annular space 36 delimited between the control rod 34 and the tubular part of the piston 20 opens out towards the outside atmosphere at the rear of the booster, for example by way of an air filter. Towards the front, this same annular space can communicate with the rear chamber 18 via a radial passage 38 formed in the central part of the piston, when boost means controlled by the plunger 32 are actuated.

Conventionally, these boost means comprise a three-way valve having an annular shutter 40 mounted in the tubular part of the piston and two annular valve seats 20a and 32a formed respectively on the central part of the piston 20 and under the plunger 32.

The shutter 40 forms the front end of smaller diameter of a flexible elastomeric sleeve, the rear end of which terminates in a bead mounted sealingly inside the tubular part 22 of the piston 20. This bead is held in place by a metal cup 42, on which bears a compression spring 44 tending to displace the shutter 40 forwards.

The annular valve seat 32a is formed on the rear end face of the plunger 32. Comparably, the annular valve seat 20a is formed on the rear end face of the central part of the piston 20 around the seat 32a. Depending on the position of the plunger 32 within the piston 20, this arrangement allows the shutter 40 constantly to bear sealingly on at least one of the valve seats 32a and 20a under the action of the spring 44.

A second passage 46 is formed in the central part of the piston 20 approximately parallel with its axis X—X', in order to put the front chamber 16 of the booster in communication with an annular chamber 48 formed around the shutter 40 on the inside of the tubular part 22 of the piston 20. When the plunger 32 occupies its rear rest position, illustrated in FIG. 1, in which the shutter 40 bears sealingly on the seat 32a of the plunger 32 and is set apart from the seat 20a of the piston 20, the front 16 and rear 18 chambers of the booster thus communicate with one another via the passage 46, the annular chamber 48 and the passage 38.

In a way itself also conventional, at least one stop member 50 mounted in the central part of the piston 20 delimits the axial stroke of the plunger 32 within the latter. The plunger 32 is normally retained in the rear rest position defined by the member 50 by means of a compression spring 52 interposed between the cup 42 and a washer 54, itself bearing on a shoulder formed on the control rod 34.

In its central part, the piston 20 comprises an annular front face 20b, at the center of which the bore 30 opens out. This annular front face 20b of the piston 20 acts on a rear face 56a of a push rod 56 via a reaction disk 58 made of a deformable material, such as an elastomer. More specifically, the push rod 56 and the reaction disk 58 are arranged along the axis X—X' of the booster in the extension of the control rod 34 and of the plunger 32. The rear surface 56a of the push rod 56 is formed on a disk-shaped plate 56b constituting the rear end of the rod 56. The plate 56b and the reaction disk 58 are covered by a cap 60 centered on the axis X—X' of the booster and interacting with an annular groove formed on the central part of the piston 20 around the annular front face 20b of the latter.

The functioning of this known booster is conventional and can be described concisely as follows.

When the booster is installed on a vehicle, the front chamber 16 communicates permanently with a vacuum source.

In a first step, the effect of the depression of the brake pedal by the driver is to equalize the prestressing force of the spring 52 less the prestressing force of the spring 44. During this slight displacement of the control rod 34 and of the plunger 32, under the action of the spring 44 the shutter 40 follows the seat 32a of the plunger 32 until it comes into contact with the seat 20a of the piston; the front 16 and rear 18 chambers of the booster are thus isolated from one another.

In a second phase of the actuation of the brake, the plunger 32 is displaced forwards sufficiently for the shutter 40 to be in sealing contact with the seat 20a of the piston and to begin to move away from the seat 32a of the plunger. Under these conditions, the rear chamber 18 of the booster is isolated from the front chamber 16 and comes into communication with the atmosphere.

The rear chamber 18, which previously communicated with the front chamber 16 and was therefore under a reduced pressure, therefore sucks air at atmospheric pressure through the valve passage of small cross-section between the shutter 40 and the plunger seat 32a. This therefore results in a major obstacle to the passage of the air and hence in a lengthening of the response time. Moreover, the air coming, for example, from the upper half of FIG. 1 in order to penetrate into the passage 38 will have to pass round the control rod 34 and the plunger 32 to arrive at the radial passage 38, thereby resulting in a turbulent and noisy flow of the air in addition to the whistling attributable to the passage through the gap between the shutter 40 and the plunger seat 32a.

The same phenomena occur during a brake release, when the air under a higher pressure is made to pass from the rear chamber 18 towards the front chamber 16 via the radial passage 38, the chamber 48 around the plunger 32, the gap between the shutter 40 and the piston seat 20a and the axial passage 46. These phenomena will therefore not be described in detail.

It will thus be understood that it is highly desirable to provide a booster where, for the same travel of the control rod 34, on the one hand the cross-section presented for the passage of the air is the largest possible and on the other hand the flow of the air has the least possible turbulence.

Figure 2:
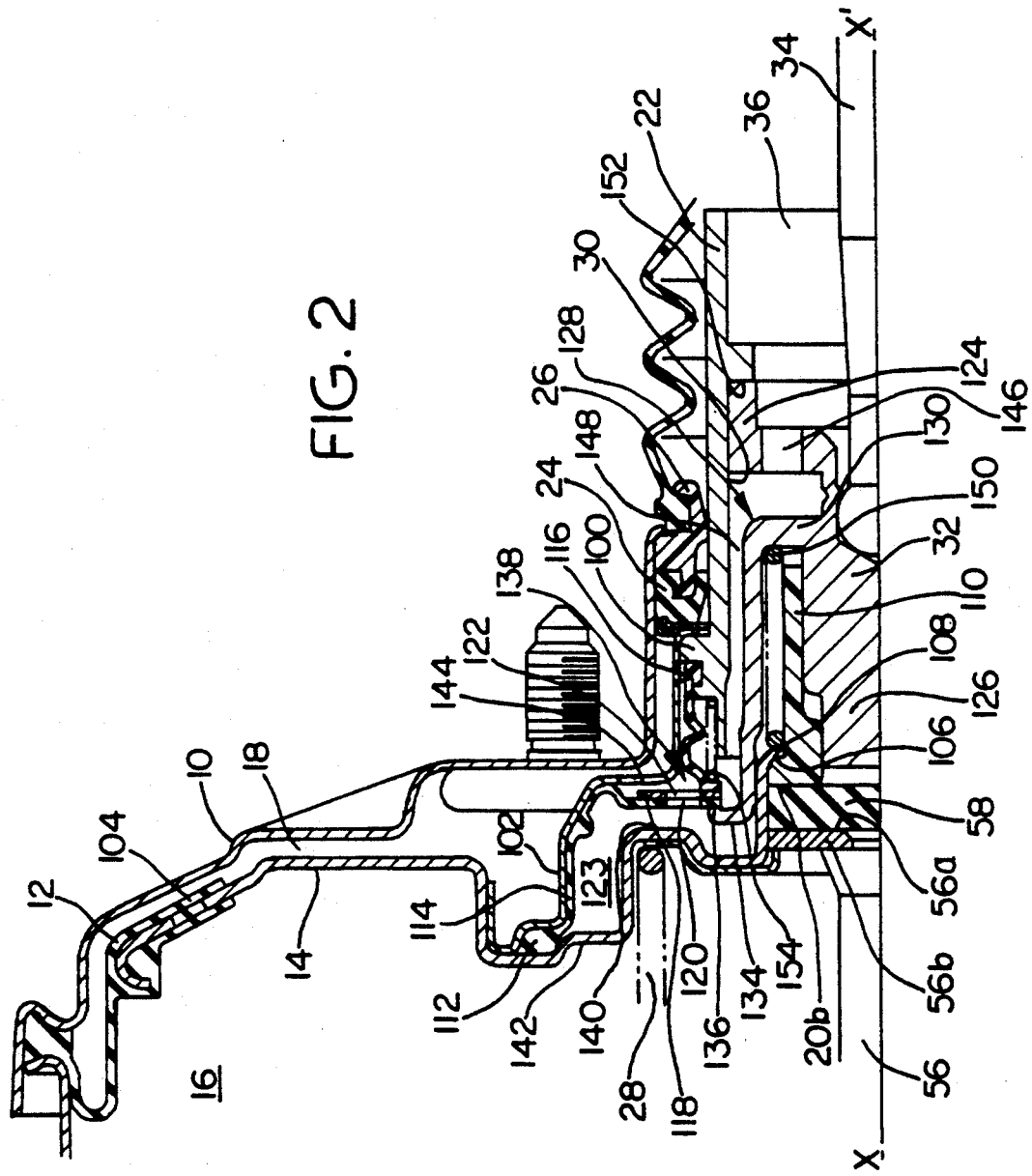
FIG. 2 is a side view in longitudinal half-section illustrating the central part of a pneumatic brake-booster produced according to the present invention.

This object is achieved by means of the invention, an exemplary embodiment of which is illustrated in FIG. 2, where the elements identical to those of FIG. 1 bear the same reference numerals.

It can be seen from FIG. 2 that the piston and the plunger have been thoroughly modified in order to achieve this object. The piston is composite, it has a tubular rear part 22 and possesses, in the vicinity of its front end, a bulge 100 retaining a piece rotational about the axis X—X' and forming an intermediate piston web 102 of general approximately frustoconical shape. Fastened, for example force-fitted, to the front end of larger diameter of the web 102 is the skirt 14, to the outer peripheral edge of which the unrolling diaphragm 12 is fastened, for example by means of orifices 104 made near the edge of the skirt 14 in order to complete the attachment of the material of the diaphragm 12. The inner peripheral edge of the skirt 14 is bent in the direction of the axis X—X', so as to form a shoulder 106 interacting with a shoulder 108 formed on a sleeve 110 having a front annular face 20b intended for interacting with the reaction disk 58, as described in respect of FIG. 1.

Retained sealingly between the skirt 14 and the front end of larger diameter of the web 102 is a bead 112 forming the front end of a flexible tubular diaphragm 114, the rear end of which forms a bead 116 retained sealingly between the rear end of smaller diameter of the web 102 and the front end of the rear tubular part 22.

An intermediate part of the flexible tubular diaphragm 114 receives an annular insert 118 on its rear face, so as to make it rigid in a plane perpendicular to the axis X—X'. The diaphragm 114 and the insert 118 have respective orifices 120 and 122 arranged opposite one another.

It can therefore be seen that the diaphragm part 114 made rigid by the insert 118 can move axially in the annular volume 123 located between the rear face of the skirt 14 and the front face of the intermediate piston web 102, the skirt 14 and the web 102 being fixed to one another, the web 102 itself being fixed to the tubular rear part 22 of the piston.

The plunger 32 is formed with a rear part 124 sliding in the bore 30 of the tubular part 22 and a front part 126 sliding inside the sleeve 110. Produced integrally between the rear 124 and front 126 parts of the plunger 32 is an extension 128 extending first radially outwards to form an annular part 130 and then, from the outer peripheral edge of the latter, axially forwards to form a cylindrical part 132 extending between the sleeve 110 and the tubular part 22 and penetrating into the annular volume 123. The cylindrical part 132 is itself extended radially outwards by an annular part 134 which comes into the annular volume 123 in front of the part of the diaphragm 114 made rigid by the insert 118 and the outside diameter of which is slightly larger than the inside diameter of the insert 118. The annular part 134 possesses, on its outer peripheral edge, a bulge 136 capable of forming a first valve seat with the diaphragm 114 made rigid by the insert 118 and itself forming a shutter 138.

A second valve seat 140 is formed by a bulge on the rear face of the skirt 14 over a circle of a diameter slightly smaller than the outside diameter of the insert 118. The bulge 140 can advantageously be formed on a convex part of the rear face of the skirt 14, so that the corresponding concave part of the front face of the skirt 14 constitutes a receptacle for the compression spring 28. Alternatively, this part of the rear face of the skirt 14 can be plane and form a bulge over the above-defined circle on the front face of the diaphragm 114 made rigid by the insert 118.

Orifices 142 are made in the skirt 14 in order to put the front chamber 16 in communication with the part of the annular volume 123 located in front of the shutter 138. Likewise, orifices 144 are made in the intermediate web 102 in order to put the rear chamber 18 in communication with the part of the annular volume 123 located behind the shutter 138. Finally, orifices 146 are made in the rear part 124 of the plunger 32 in order to put the annular space 36 behind the plunger 32, where atmospheric pressure prevails, in communication with the annular volume 123 by way of the annular space 148 between the cylindrical part 132 of the plunger 32 and the tubular part 22 of the piston.

The plunger 32 and the control rod 34 are returned to their rear rest position by a return spring 150 bearing, on the one hand, on the rear face of the part of the skirt 14 forming the shoulder 106 and, on the other hand, on the front face of the annular part 130 of the extension 128 of the plunger 32, the skirt 14 itself being returned to its rear rest position by the spring 28. In its rear rest position, the plunger 32 comes up against a shoulder 152 formed inside the tubular rear part 22 of the piston. The shutter 138 is stressed forwards by a shutter spring 154 bearing, on the one hand, on the rear face of the diaphragm 114 made rigid by the insert 118 forming the shutter 138 and, on the other hand, on the front face of the bulge 100 formed at the front end of the tubular rear part 22.

It can therefore be seen that, according to the invention, there has been provided a booster comprising a piston 20 formed by a composite movable wall consisting of the skirt 14 equipped with the unrolling diaphragm 12 and fixed to the intermediate web 102, itself fixed to the tubular rear part 22, this piston being capable of acting on the push rod 56 via the reaction disk 58 by means of the front annular face 20b of the sleeve 110, the latter also serving as a guide element for the plunger 32.

The valve means consist of the shutter 138 which is formed on an intermediate part of a tubular diaphragm fastened at its ends to the composite movable wall and which interacts with a valve seat 136 formed on the plunger and a valve seat 140 formed on the composite movable wall.

Moreover, the valve means is located in front of the forward end of the plunger 32, and more precisely in front of the part of the casing extending perpendicularly to the axis X—X'. This results in the advantage that the invention may be used with conventional servomotor casings, without being obliged for the latter to have a special design.

The functioning of this booster provided according to the invention is easily inferred from the foregoing explanations. With the booster at rest, as in FIG. 2, the front chamber 16 is in communication with the rear chamber 18 via the orifices 142, the valve passage 140-138 in the volume 123 and the orifices 120, 122 and 144. The effect of actuating the control rod 34 is to cause the plunger 32 to advance counter to the action of the spring 150. The shutter 138 remains laid on the valve seat 136 of the plunger 32 under the action of the spring 154, until it comes into contact with the valve seat 140 of the movable partition, thereby closing the valve passage 140-138 and isolating the front 16 and rear 18 chambers from one another.

When the control rod 34 and the plunger 32 continue to be actuated, the cylindrical part 132 of the latter continues to penetrate into the volume 123. The shutter 138 then comes to bear on the valve seat 140 of the piston, while the valve seat 136 of the plunger 32 moves away from the shutter 138.

Air at atmospheric pressure can then penetrate into the rear chamber 18 via the orifices 146 in the rear part of the plunger 32, the annular space 148 between the cylindrical part 132 of the plunger 32 and the tubular part 22 of the piston, the valve passage 136-138, the orifices 120 and 122 formed in the diaphragm 114 and the insert 118, and finally the orifices 144 in the intermediate web 102.

It can thus be seen that, by means of the invention, the air is admitted into the rear chamber 18 via the valve passage 136-138 which is of a diameter several times larger than in a conventional booster as described in respect of FIG. 1. It has thus been possible to produce valve passages 136-138 of a diameter equal to five times the diameter of a conventional valve passage. It follows, in this example, that the passage cross-section presented to the air is itself multiplied by five, and therefore that the air flow towards the rear chamber is itself also multiplied by five. A booster, the response time of which is shortened considerably, is therefore indeed obtained. It goes without saying that the value of five is not critical, but has merely been chosen as an example.

Any other factor of enlargement of the valve passage in relation to a conventional booster can be selected according to the desired result.

It will be understood that the same phenomenon of reduction of the response time of the booster occurs during a brake release. In fact, when the force applied to the control rod decreases, the latter retracts and in its movement drives the plunger 32. The valve seat 136 of the plunger 32 thereby returns into contact with the shutter 138, the valve seat 140 still being in contact with the shutter 138. When the plunger 32 continues to retract, the valve seat 136 of the plunger then causes the shutter 138 to move away from the valve seat 140. The air contained in the rear chamber 18 is thus sucked into the front chamber via the orifices 144 in the intermediate web 102, the orifices 122 and 120 in the diaphragm 114 and the insert 118, the valve passage 138-140 and finally the orifices 142 in the skirt 14. To allow a rapid rebalancing of pressure (of vacuum in this particular case) between these two chambers 16 and 18, the plunger 32 is allowed to retract over a relatively long distance in relation to the valve body and therefore to the piston 20, the valve passage between the valve seat 140 of the piston 20 and the shutter 138 being determined exactly by the rear part 124 of the plunger, under the effect of the return spring 150, coming up against the shoulder 152 formed inside the tubular rear part 22 of the piston 20. It can thus be seen, here again, that the air is made to flow through the valve passage 138-140 of a diameter clearly larger than that of conventional valve passages and therefore of greater area allowing a higher flow, thereby resulting in a greatly reduced response time in the brake-release phase.

It can therefore be seen that, as a result of the arrangement of the valve seats 136 of the plunger and 140 of the piston, and of the shutter 138, the fluid flow between the atmosphere and the rear chamber, and between the rear chamber and the front chamber, is increased to an appreciable extent, proportionally reducing the response time of the booster in both the braking phase and the brake-release phase.

Due to the location of the valve means in front of the part of the casing extending perpendicularly to the axis X—X', and due to the fact that the second valve seat is formed on the skirt of the piston, it can be seen that the annular part 134 of the plunger may be given any desired external diameter for broadening accordingly the diameter of the valve passages 136-138 and 140-138, and reducing accordingly the response time of the servomotor.

The invention also makes it possible to reduce the operating noise of the booster to a considerable extent. In fact, it was seen that, during braking, the air flows via the orifices 146, the annular space 148, the valve passage 136-138 and the orifices 120, 122 and 144 and, during brake release, it flows via the orifices 144, 122 and 120, the valve passage 138-140 and the orifices 142. The special design of the booster according to the invention makes it possible to ensure that there is an equal number of orifices 142, 120, 122, 144 and 146 uniformly distributed about the axis X—X' so that their centers are in the same plane, as illustrated in FIG. 2. Thus, the air masses set in motion during the functioning of the booster of the present invention will have a velocity the components of which will be contained in only one plane, for example that of FIG. 2. In other words, the flow of air in the booster is perfectly symmetrical about the axis X—X' under all operating conditions, that is to say all the turbulence and the noise resulting from it are eliminated.

It is therefore seen clearly that, according to the present invention, there has been provided a pneumatic booster, in which the special arrangement of the valve means allows it to function silently and with very brief response times. Of course, the invention is not limited to the embodiment described by way of example, but is capable of acquiring many alternative versions which will appear to an average person skilled in the art. Thus, for example, the unrolling diaphragm and the flexible tubular diaphragm on which the shutter is formed can be produced in one piece. Likewise, the invention can be applied to boosters in tandem or with an additional chamber.

We claim:

1. A pneumatic brake-booster, comprising a casing within which is located a piston comprising a rear tubular part supporting a skirt and, with the aid of an unrolling diaphragm, defining a front chamber connected permanently to a vacuum source and a rear chamber connected selectively to one of the front chamber and atmosphere by valve means actuated by a control rod capable of bearing by means of a plunger on one face of a reaction disk adjacent a push rod, a return spring for the control rod arranged between the skirt of the piston and the plunger, the valve means including a shutter interacting, by an active rigid part having an insert, with a first valve seat located at the plunger and with a second valve seat located at the piston, and the shutter comprising a flexible tubular diaphragm, the active rigid part of the shutter located between two ends of the flexible tubular diaphragm, characterized in that the shutter includes orifices allowing communication between the front chamber and the rear chamber, and said orifices in the shutter located in the active rigid part between the first valve seat and second valve seat.

2. The booster according to claim 1, characterized in that the second valve seat is located at the skirt of the piston.

3. The booster according to claim 1, characterized in that the piston includes an intermediate piston web defining an annular volume with the skirt of the piston.

4. The booster according to claim 3, characterized in that the first and second valve seats and the shutter define portions of the perimeter of the annular volume.

5. The booster according to claim 1, characterized in that orifices are located in the skirt in order to put the front chamber in communication with the annular volume, and orifices are located in the intermediate piston web in order to put the rear chamber in communication with the annular volume.

6. The booster according to claim 5, characterized in that orifices are located in the plunger in order to put the annular volume in communication with atmosphere.

7. The booster according to claim 6, characterized in that the orifices in the plunger, shutter, skirt, and intermediate piston web are distributed uniformly about an axis of symmetry of the booster, are of equal number, and are aligned about the axis of symmetry to have centers located in linear alignment.

* * * * *